United States Patent [19]
Arimilli et al.

[11] Patent Number: 6,092,132
[45] Date of Patent: Jul. 18, 2000

[54] METHOD AND APPARATUS FOR MONITORING 60X BUS SIGNALS AT A REDUCED FREQUENCY

[75] Inventors: Ravi Kumar Arimilli; Keenan Wynn Franz; David B. Shuler; Derek Edward Williams, all of Austin, Tex.

[73] Assignee: International Business Machines Corporation, Armonk, N.Y.

[21] Appl. No.: 09/175,612

[22] Filed: Oct. 19, 1998

[51] Int. Cl.⁷ .............................. G06F 13/00; G06F 13/42
[52] U.S. Cl. .......................... 710/100; 713/501; 714/724
[58] Field of Search ................................ 714/724, 34, 25, 714/3, 47; 710/100, 126, 129; 712/32; 713/501; 324/765

[56] References Cited

U.S. PATENT DOCUMENTS 5,491,793  2/1996  Somasundaram et al. .
5,600,802  2/1997  Yazdy et al. .
5,603,041  2/1997  Carpenter et al. .
5,917,834  6/1999  Arkin .

*Primary Examiner*—Gopal C. Ray
*Attorney, Agent, or Firm*—Leslie A. Van Leeuwen

[57] ABSTRACT

An apparatus and method for monitoring a PowerPC 60x bus within an integrated circuit is described. The 60x bus operates at a particular frequency, $f_b$. An image of the 60x bus is produced, operating at a lower frequency of operations, $f_o$, which is more amenable to monitoring by test equipment. Signals are received from and driven to the bus using driver/receiver circuitry. The signals may be input-only, output-only, or bi-directional signals. The signals to be monitored are tapped in the driver/receiver circuitry. Masking circuitry within the driver/receiver circuitry masks bi-directional signals, such as ARTRY__ and SHD__, during the pre-charge cycles, when these bi-directional signals are in an unpredictable state. Depending on the placement of the signal taps in the driver/receiver logic, the signals may be "out-of-phase" with respect to one another. A buffer/align unit is used to bring each of the monitored signals back in phase relative to one another. Encoding circuitry encodes the time delayed version of the bus in a manner that produces an image of the bus at the lower frequency of operations, $f_o$. The encoding circuitry considers the values of the monitored signals over an encoding window, and produces an encoded value for each signal at the lower frequency of operations, $f_o$.

24 Claims, 10 Drawing Sheets

METHOD AND APPARATUS FOR MONITORING 60X BUS SIGNALS AT A REDUCED FREQUENCY

CROSS-REFERENCE TO RELATED APPLICATION

The subject matter of this application is related to co-pending application Ser. No. 09/175,391, entitled "Method And Apparatus For Monitoring Signals At A Reduced Frequency," filed concurrently with this application. The foregoing application is assigned to a common assignee with this application, and is incorporated herein by reference.

FIELD OF THE INVENTION

The present invention generally relates to data processing systems, and more specifically, to methods and apparatuses residing in such systems that allow for the monitoring of PowerPC 60x bus signals, that might otherwise be unobservable, at a reduced frequency.

BACKGROUND OF THE INVENTION

The evolution of the computer industry has been driven by the insatiable appetite of the consumer for ever increased speed and functionality. To meet this demand, computer designs rely on, among other innovations, two major techniques: increased frequency of operation for the circuitry comprising the computer system, and increased integration of functions onto a single integrated circuit (referred to as a very large scale integrated circuit, or VLSI chip).

These two techniques are interrelated. By placing more functionality onto a single integrated circuit, a greater frequency of operation for the communication paths between functional units can be achieved. Circuitry interconnect within a VLSI chip is typically one to two orders of magnitude faster than interconnections between physically distinct chips.

Increased density allows more functional units and their communication paths to be integrated onto a single VLSI chip as opposed to multiple chips inter-connected by a circuit board, MCM (multi-chip-module), or other means. Communication paths between functional units in an overall design are becoming an increasingly dominant factor in the overall performance of computing systems.

In addition, the progression of chip fabrication technology allows for higher frequency circuits and higher density circuits. This results in more functions being integrated onto a single VLSI chip and the circuits in these higher integration chips operating at ever increasing frequencies.

Increased density and higher frequency provide for increased performance and lower cost to the consumer. However, these design trends produce difficulties for chip designers. As the density of integration of circuits on a typical VLSI chip increases, chips become more complex functionally and therefore more prone to design errors. Prefabrication simulation and verification techniques are used to remove as many design faults as possible. Unfortunately, these techniques fail to produce a chip guaranteed to be free of design errors and, inevitably, debugging of a chip's design occurs after the chip has been fabricated and introduced into a system.

However, once a chip is fabricated, it is often impossible to directly observe the internal communication paths between functional units. These internal paths cannot be directly connected to test equipment to monitor their behavior. Access to these internal communication paths can be critical for debugging errors in a design.

In order to alleviate this problem, a number of chip pins are often dedicated to providing external visibility to one or more on-chip communication paths. The internal communication paths are connected to these dedicated pins which are then further connected to a connector providing an attachment point for test equipment. While this method does allow for monitoring of bus signals, it involves certain limitations.

The frequencies achieved by these on-chip interconnection paths can place an extreme burden on available test equipment. These frequencies can be difficult or impossible to monitor with the commercially available test equipment even though the internal communication path is exposed to the test equipment. Even in those cases where the frequency of operation is within the capabilities of available equipment, higher frequency operation requires the use of more expensive test equipment. Furthermore, as frequencies increase, the amount of functionality available from and number of signals that can be monitored simultaneously by the test equipment decreases.

It would, therefore, be a distinct advantage to have a method and apparatus that would allow for the monitoring, without loss of information, of internal communication paths of a VLSI chip at a lower frequency of operation. The present invention provides such a method and apparatus.

SUMMARY OF THE INVENTION

Accordingly, the present invention is directed to an apparatus and method for monitoring a PowerPC 60x bus within an integrated circuit. The 60x bus operates at a particular frequency, $f_b$. An image of the 60x bus is produced, operating at a lower frequency of operations, $f_o$, which is more amenable to monitoring by test equipment.

Signals are received from and driven to the bus using driver/receiver circuitry. The signals may be input-only, output-only, or bi-directional (i.e. input/output) signals. The signals to be monitored, which are typically a subset of the available bus signals, are tapped in the driver/receiver circuitry. Masking circuitry within the driver/receiver circuitry masks bi-directional signals, such as ARTRY__ and SHD__, during the pre-charge cycles, where these bi-directional signals are in an unpredictable state.

Depending on the placement of the signal taps in the driver/receiver logic, the signals may be "out-of-phase" with respect to one another. That is to say, each of the various signals may be coincident with, or delayed or advanced by, one or more cycles relative to the internal bus in time. A buffer/align unit processes the signals in order to produce a time delayed version of the signals. The buffer/align unit is used to bring each of the monitored signals back in phase relative to one another.

Encoding circuitry encodes the time delayed version of the bus in a manner that produces an image of the bus at the lower frequency of operations, $f_o$. The encoding circuitry considers the values of the monitored signals over an encoding window, and produces an encoded value for each signal at the lower frequency of operations, $f_o$.

Most signals in bus protocols, such as the 60x bus protocol, fall into one of three categories. First, the signal value need only be sampled once per operation, and the timing of when the signal is asserted or valid within an encoding window can be derived from other signal(s) in the protocol. Second, the signal can only be asserted once per operation, and the timing of when the signal is asserted within an encoding window cannot be derived from other signals in the protocol. Finally, the signal can be asserted or deasserted for each cycle of an operation, and therefore can take on any value for each cycle of an encoding window. These signals are referred to as Type I, Type II, and Type III signals respectively. The encoding circuitry produces debug signals, referred to as a debug bus, by taking each signal from the buffer/align unit and encoding the signal according to whether the signal is a Type I, Type II, or Type III signal.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE PRESENT INVENTION

In the following description, numerous specific details are set forth, such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
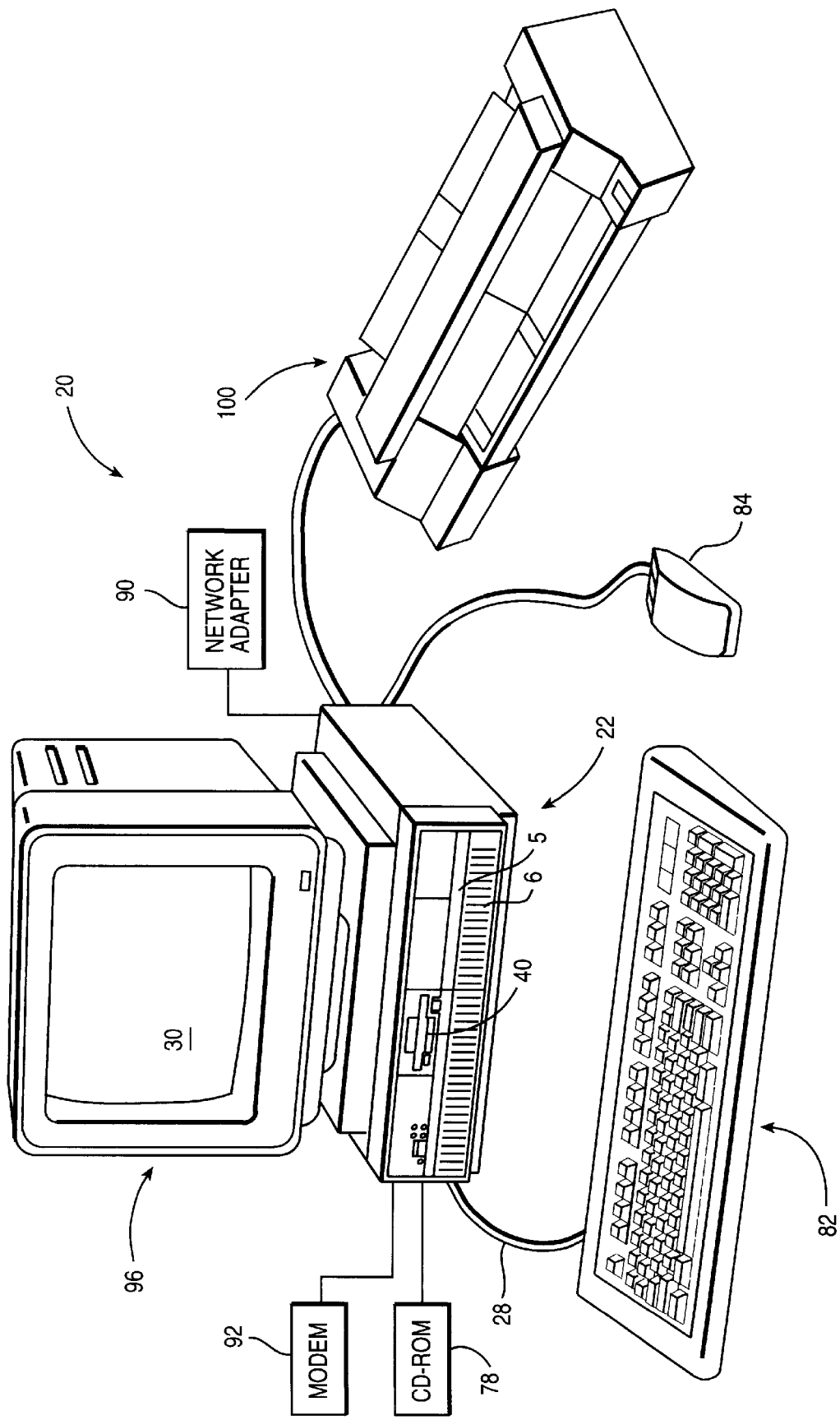
FIG. 1 is a block diagram of a data processing system in which the present invention may be implemented.

The invention may be implemented on a variety of hardware platforms, including personal computers, workstations, mini-computers, servers, and mainframe computers. Reference now being made to FIG. 1, a typical data processing system 20 is shown in which the present invention can be practiced. Data processing system 20 includes processor 22, keyboard 82, and display 96. Keyboard 82 is coupled to processor 22 by cable 28. Display 96 includes display screen 30, which may be implemented using a cathode ray tube (CRT), a liquid crystal display (LCD), an electrode luminescent panel, or the like. Data processing system 20 also includes pointing device 84, which may be implemented using a track ball, a joy stick, a touch sensitive tablet or screen, a track path, or by a mouse as illustrated. Pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using any one of several known off-the-shelf components.

Figure 2:
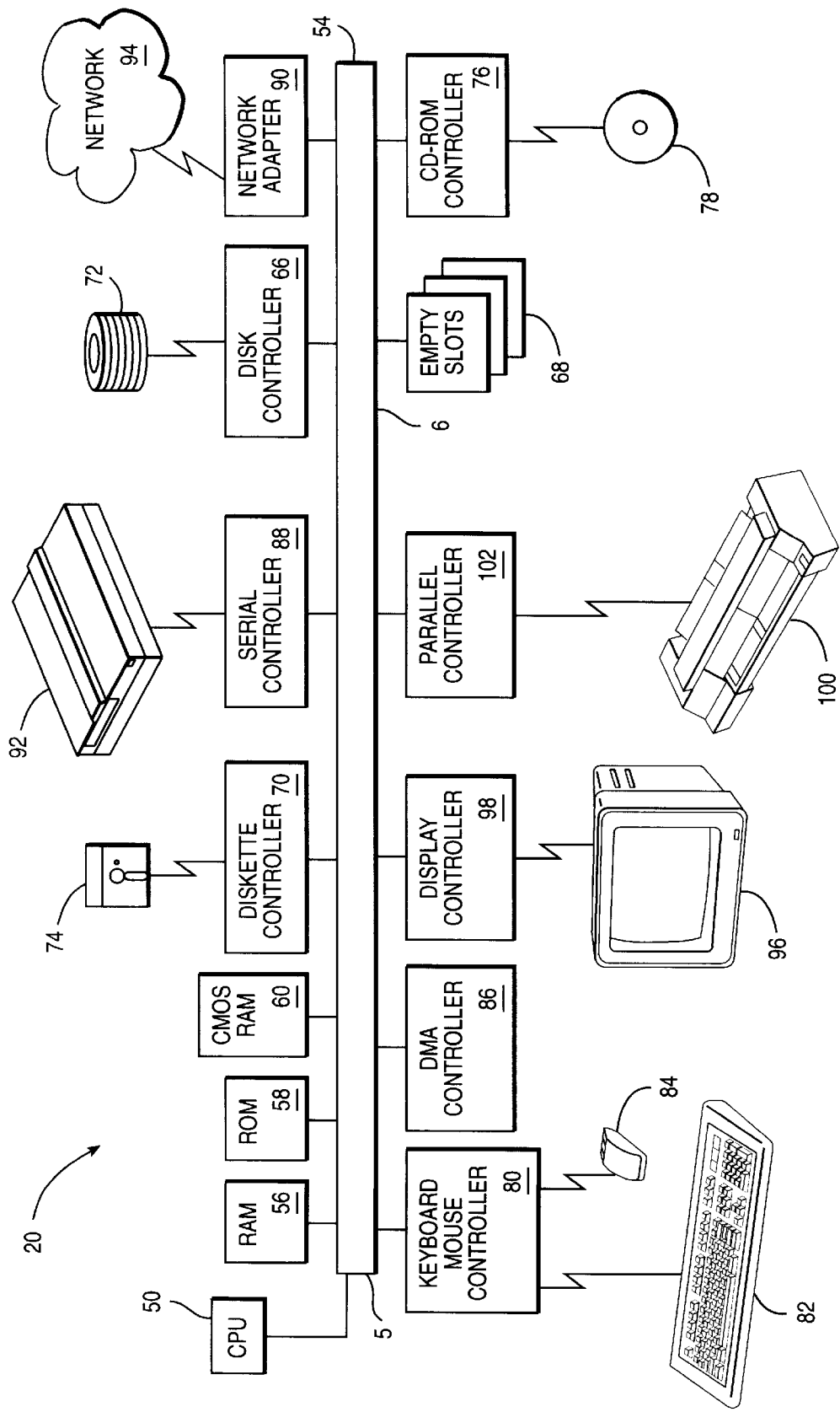
FIG. 2 is a block diagram providing further details of the data processing system depicted in FIG. 1.

Reference now being made to FIG. 2, a high level block diagram is shown illustrating selected components that can be included in data processing system 20 of FIG. 1 according to the teachings of the present invention. Data processing system 20 is controlled primarily by computer readable instructions, which can be in the form of software, wherever, or by whatever means such software is stored or accessed. Such software may be executed within Central Processing Unit (CPU) 50 to cause data processing system 20 to do work.

Memory devices coupled to system bus 5 include Random Access Memory (RAM) 56, Read Only Memory (ROM) 58, and nonvolatile memory, CMOS RAM 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components and that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit cardsized devices designed to plug into a slot in the side or back of a computer. An example of such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning a read/write head, mediating between the drive and the CPU 50, and controlling the transfer information to and from memory. A single disk controller may be able to control more than one disk drive.

CD-ROM controller 76 may be included in data processing system 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, and the trackpad.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include the RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to sources of software or information, such as a server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as a transparency. Other types of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in data processing system 20 and defines the medium for data exchange. System bus 5 connects together and allows for the exchange of data between memory units 56, 58, and 60, CPU 50, and other devices as shown in FIG. 2.

In many data processing systems (e.g., the exemplary data processing system depicted in FIGS. 1 and 2), it often occurs that there are one or more VLSI chips with one or more internal communication paths. It would be advantageous to monitor these internal communication paths for purposes of debugging problems with the system's behavior. In the following description, an internal communication path will be referred to as a "bus." For the purposes of the following description, a "bus" is construed to mean a collection of signals used to communicate between functional units within a VLSI chip.

In general, most buses exhibit an "operation" based design. That is to say, the protocol for the utilization of the bus consists of a number of "operations" which are the basic actions that occur on the bus. Typically, these operations take a number of cycles to occur on the bus. Under these circumstances, the effective frequency at which operations can occur on the communications pathway is lower than the overall frequency of operation of the bus.

For example, consider a bus that operates at a basic frequency of 300 Megahertz, but that only allows an operation every three cycles. In such a situation, the frequency of operations, as opposed to the basic frequency of the bus, is 100 Megahertz.

In order to allow for the monitoring of an internal bus at a reduced frequency, the present invention utilizes the fact that in most buses, operations can take place at most at some reduced frequency from the frequency of operation of the overall bus. In the following description, the basic frequency of the bus will be referred to as $f_b$, while the frequency of operations will be referred to as $f_o$.

Figure 3:
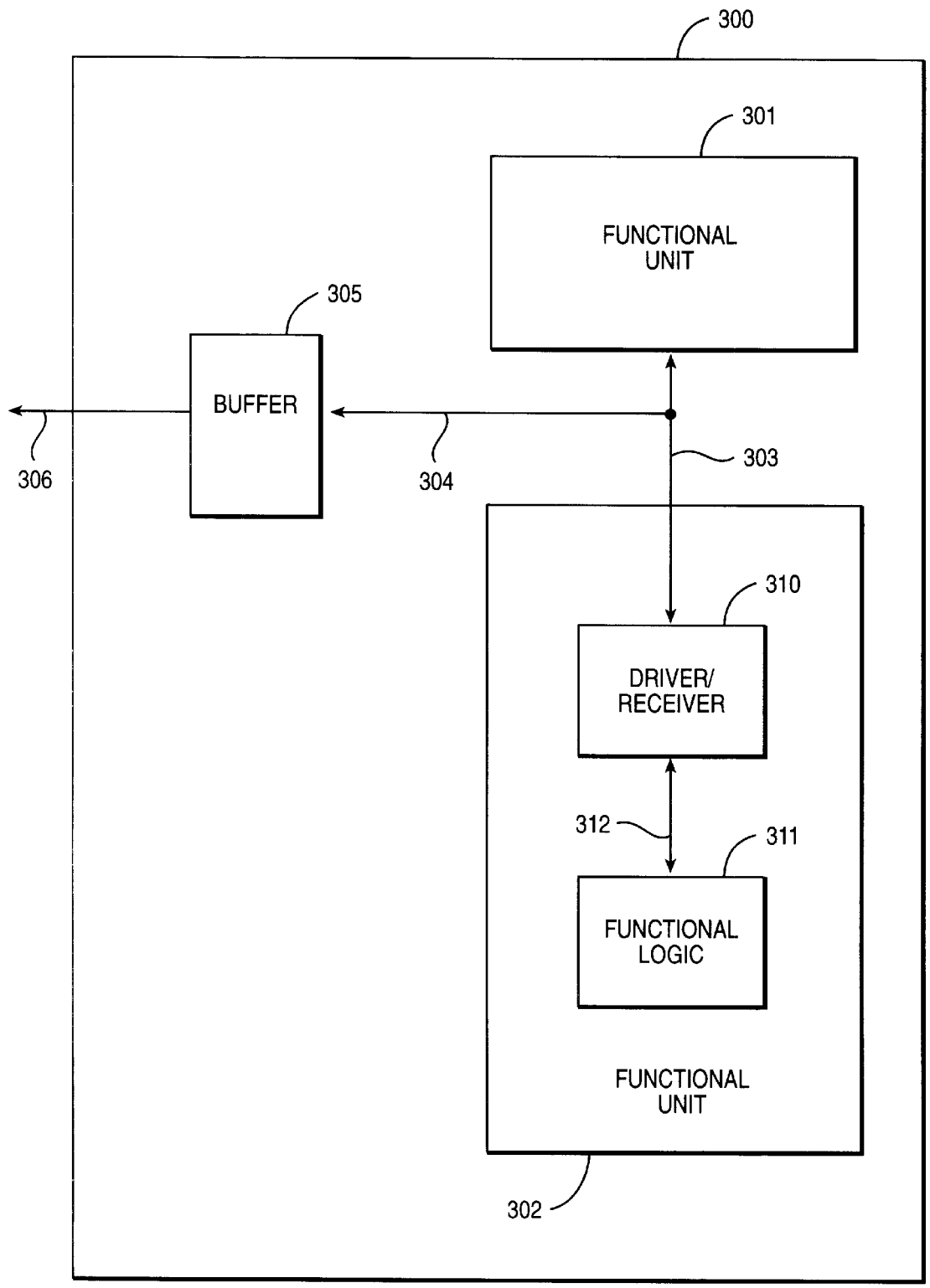
FIG. 3 is a schematic diagram of a VLSI chip utilizing a prior art monitoring mechanism.

Reference now being made to FIG. 3, a schematic diagram is shown illustrating prior art VLSI chip 300. As shown, functional units 301 and 302 are connected and communicate by means of internal bus 303. A dedicated connection, 304, is made to bus 303 for purposes of monitoring the bus signals. This connection links bus 303 and buffering logic 305 that buffers bus 303 as necessary before presenting the signals to the VLSI chip external pins 306.

Within functional unit 302 itself, bus 303 is connected to driver/receiver circuitry 310. This circuitry is used to buffer and redrive bus 303 by means of latches, drivers, receivers, buffers and/or other devices before it is presented to functional circuitry 311 by means of interconnection 312.

The prior art monitoring mechanism shown in FIG. 3 has a number of drawbacks. First, internal bus 303 is presented to external pins 306 at the basic frequency of bus 303. Further, dedicated interconnection 304 places an additional electrical load on bus 303.

It should also be noted that while FIG. 3 shows an internal bus that only connects two functional units, it is common for buses to take on any of a number of more complex topologies, such as one functional unit connecting to multiple functional units, multiple functional units connecting to multiple units, etc. The alterations to the present invention to support such topologies will be apparent to one skilled in the art.

In addition, in many buses, collections of signals are often logically grouped to convey a certain piece of information defined by the bus protocol. For example, it is common to have a number of grouped signals that form what is often referred to as the "address" of a protocol. In the following description, the term "signal" will be used interchangeably to signify individual signals and/or any logically grouped set of signals. In other words, a "signal" can either be a single wire interconnect or a number of wires that are grouped and are considered as a single multi-bit interconnect.

A bus typically consists of one or more signals used to communicate information. From a given functional unit's point of view, a signal may either be an input-only signal, an output-only signal, or a bi-directional signal. An input-only signal is a signal that conveys information into the functional unit. An output-only signal is a signal that conveys information out of the functional unit. A bi-directional signal conveys information both into and out of the functional unit, but not necessarily simultaneously.

A signal that is an output-only signal for a given functional unit is an input-only signal for other functional unit(s) and vice-versa. Bi-directional signals can be bi-directional, input-only, or output-only for other functional units. Depending on the needs of the bus protocol, a bus (from a given functional unit's point of view) need not consist of all three different types of signals. Any non-empty subset of these types is possible.

Figure 4:
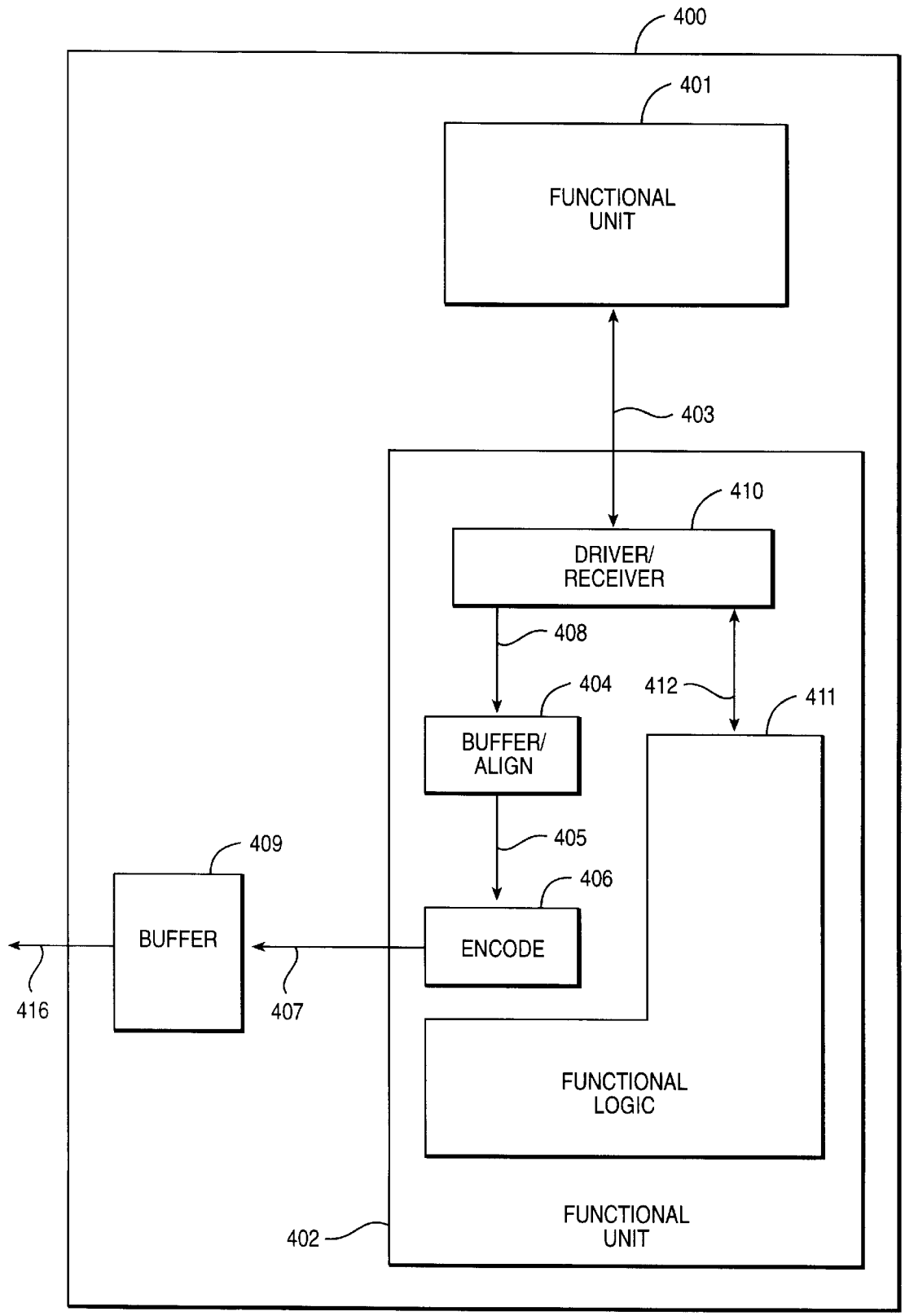
FIG. 4 is a schematic diagram of a VLSI chip utilizing a monitoring apparatus according to the teachings of the present invention.

Reference now being made to FIG. 4, a monitoring method and apparatus according to the teachings of the present invention will now be described. As shown, internal bus 403 connects functional units 401 and 402 in VLSI chip 400. Functional unit 402 includes driver/receiver circuitry 410, which is described in detail below, with reference to FIG. 5. Driver/receiver circuitry 410 includes interconnection 408, that consists of signal taps of all the monitored signals of bus 403. Note that the monitored signals are typically a subset of all the available bus signals.

Buffer/align unit 404 processes the signals on interconnect 408 in order to produce a time delayed version of the monitored signals of bus 403 on interconnect 405. This process is described in detail below, with reference to FIG. 6. Interconnect 405 is processed by encoding unit 406 to produce a reduced frequency version of bus 403, i.e. the debug bus, on interconnect 407. The debug bus is conveyed to external VLSI chip pins 416 by means of buffering circuitry logic 409.

Figure 5:
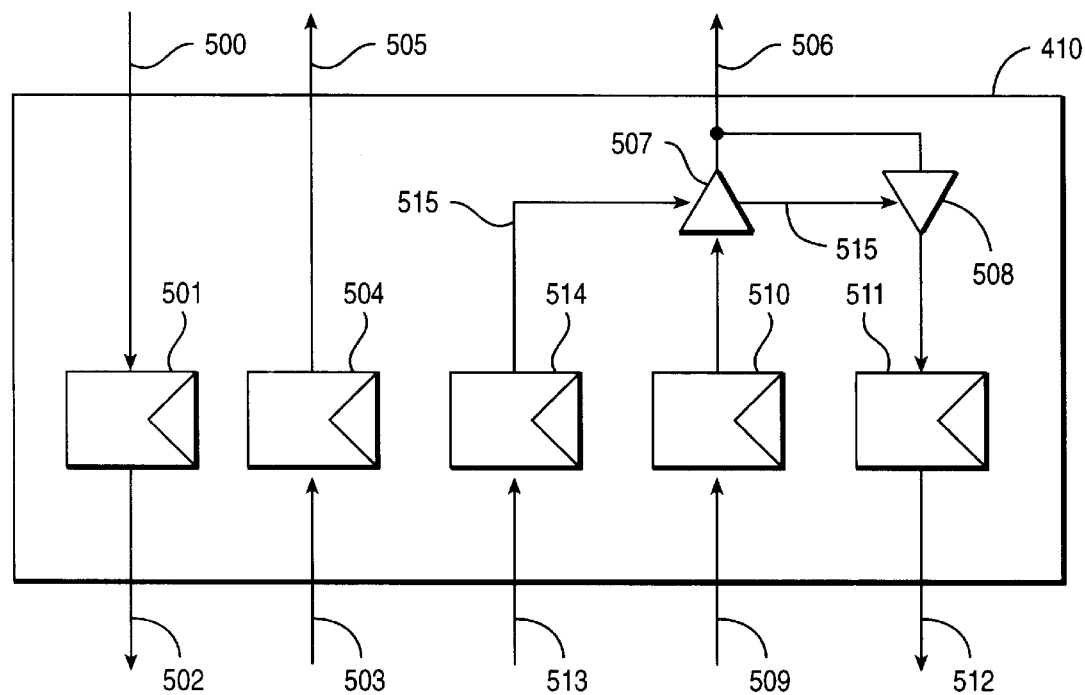
FIG. 5 is a schematic diagram of driver/receiver circuitry.

With reference now to FIG. 5, exemplary circuitry for driver/receiver circuitry 410 will now be described. A schematic representation is shown for an input-only signal, an output-only signal, and a bi-directional signal. If a bus contains more than one signal of a given type, the structures shown in FIG. 5 are duplicated as necessary to include all the signals of bus 403. Note that signals 500, 505, and 506 are signals which are driven to or received from internal bus 403 (shown in FIG. 4).

Input-only signal 500 is captured by latch 501 to produce signal 502 which is one cycle delayed from bus signal 500. Output-only signal 503 is driven to latch 504 producing bus signal 505 which is one cycle delayed from signal 503. Finally, bi-directional signal 506 is produced from driver 507 and receiver 508. Signal 509, which constitutes the output portion of signal 506, is received by latch 510 and conveyed to driver 507 to drive signal 506. Likewise signal 506 is connected to receiver 508 and conveyed to latch 511 forming signal 512, a one cycle delayed version of signal 506 constituting the input portion of signal 506. Signal 513 is conveyed to latch 514 producing signal 515, controlling whether functional unit 402 is receiving or driving signal 506.

The driver/receiver circuitry shown in FIG. 5 is representative of a common method of processing bus signals. Many other possibilities for latching and redriving bus signals are known to those skilled in the art. In the following description, the current invention will be described using the driver/receiver circuitry of FIG. 5. Alterations necessary to practice the current invention with other driver/receiver logic implementations will be apparent to those skilled in the art.

Figure 6:
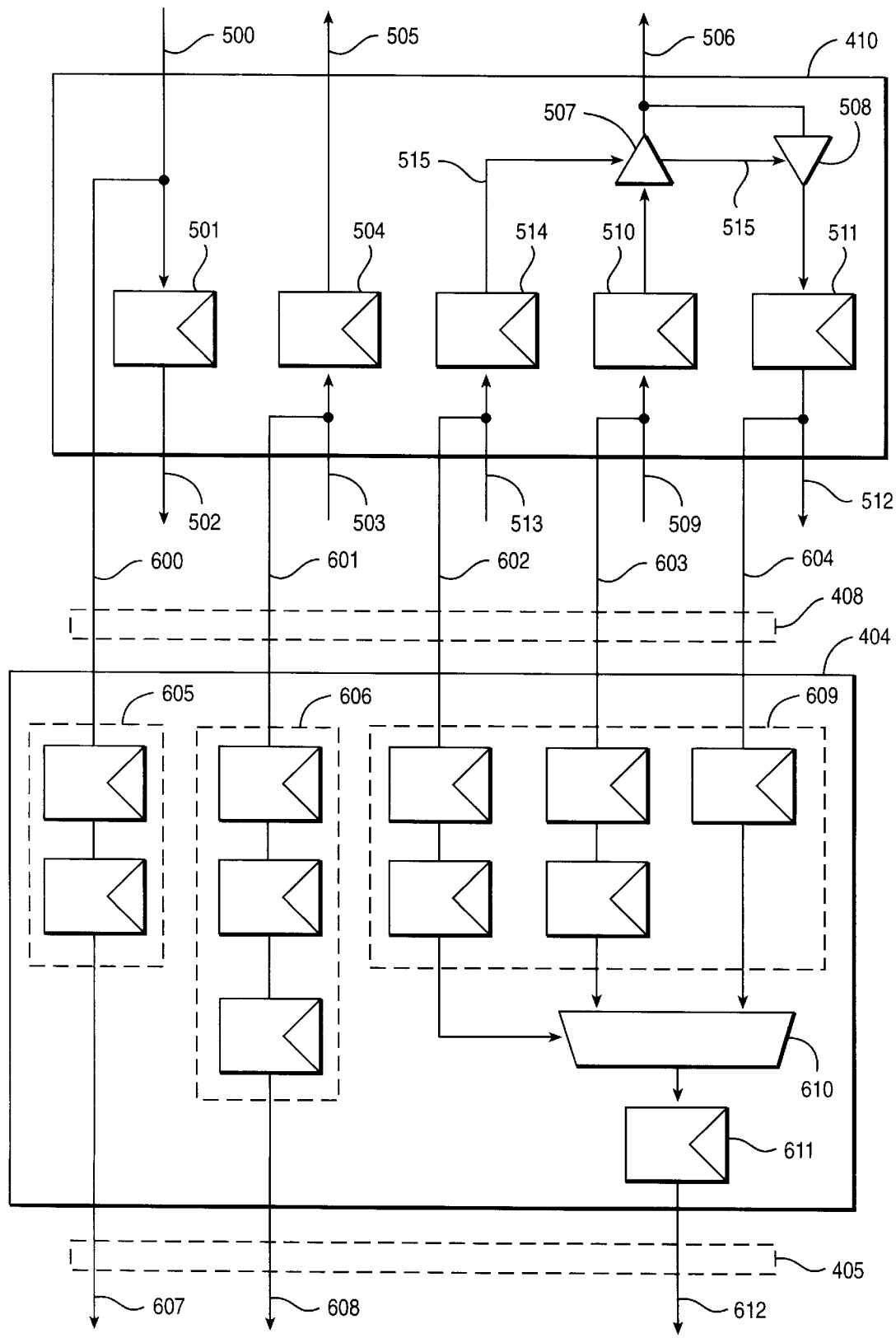
FIG. 6 is a schematic diagram of driver/receiver circuitry and buffer/align circuitry.

With reference now to FIG. 6, a more detailed representation of driver/receiver circuity 410 and buffer/align unit 404 will now be described. Driver/receiver circuitry 410 produces a new set of signals, 600–604, that are taps of signals within driver/receiver logic 410 necessary to reproduce the monitored signals of bus 403. Signals 600–604 are driven to interconnect 408.

In general terms, the signals of interconnect 408 are used by buffer/align unit 404 to produce a time-delayed version of bus 403. Each signal, whether input-only, output-only, or bi-directional, is tapped from signals within driver/receiver logic 410. The exact placement of the signal taps within driver/receiver logic 410 determines the structure of buffer/align unit 404.

In FIG. 6, only one of many possible specific implementations is shown. In the following description, the placement of the signal tap within driver/receiver logic 410, and therefore the subsequent structure of buffer/align unit logic 404 will be described for each of the three signal types: input-only, output-only, and bi-directional.

For an input-only signal, a single signal ,600, is needed to convey the bus information to buffer/align unit 404. One of two possible choices exists for the location of the signal tap of the input-only signal: attach to signal 500, i.e. the input to latch 501, or attach to signal 502, i.e. the output of latch 501. In the implementation shown in FIG. 6, signal 600 is tapped to signal 500. This places an additional electrical load on bus 403, which may not be desirable. However, by careful physical co-location of latch 501 and the first latch in delay line 605, this load can be greatly minimized. It is also possible to tap signal 502. This choice places an additional electrical load on the path to functional logic 411. The optimal choice depends on a number of circumstantial factors specific to a given implementation and will be apparent to one skilled in the art.

For an output-only signal, a single signal, 601, is used to convey the bus information to buffer/align unit 404. As with an input-only signal, this signal tap can occur at the input or output of latch 504 driving the signal. In the specific implementation shown in FIG. 6, the signal is tapped at the input of latch 504 to form signal 601.

Finally, for a bi-directional signal, three signals, 602–604, are needed for buffer align unit 404 to recreate the bi-directional bus signal. Signal 602 is a tap of bi-directional control signal 513. Signals 603 and 604 are taps, respectively, of input signal 509 and output signal 512 of the bi-directional signal. In the specific implementation shown in FIG. 6, the signal taps for bi-directional control signal 513 and the output portion, 509, occur at the inputs of the latches for these signals (i.e. latches 514 and 510, respectively). The signal tap for the input portion, 512, of the bi-directional signal occurs at the output of latch 511, receiving the signal from bus 403.

As with the input-only and output-only signals, the signal taps for a bi-directional signal can be placed at either the input or output of the appropriate latch. The optimal choice is specific to a given situation and will be apparent to one skilled in the art.

The function of buffer/align unit 404 is to process the signals of interconnection 408 and produce a time-delayed version of the monitored signals of bus 403. Depending on the placement of the signal taps in driver/receiver logic 410, the signals on bus 408 may be "out-of-phase" with respect to one another. That is to say, each of the various signals of interconnect 408 may be coincident with, or delayed or advanced by, one or more cycles relative to bus 403 in time. Buffer/align unit 404 is used to bring each of the signals on interconnect 408 back in phase relative to one another.

Signal 600, the signal tap for input-only signal 500, is in phase with its counterpart signal on bus 403. However, signal 601, the signal tap for output-only signal 505, is one cycle ahead of its counterpart signal on bus 403. To bring these signals into phase, buffer/align unit 404 uses two latch delay lines, 605 and 606, to bring the signals into phase. Input-only signal tap 600 is delayed by two latches to produce signal 607, which is two cycles delayed from its counterpart on bus 403. Likewise, output-only signal tap 601 is delayed by three latch stages to produce signal 608, which is two cycles delayed from its counterpart on bus 403.

For bi-directional signal 506, a group of latches, 609, is used to bring the input portion signal tap 604, the output portion signal tap 603, and the bi-directional control signal tap 602 into phase with one another in a manner similar to that described for the input-only and output-only signal taps, but only one cycle delayed from their counterparts on bus 403. After these signals are in phase, multiplexer 610 is used to choose between the delayed input or output portion of signal 506 based on the value of the delayed bi-directional control signal tap 602. The multiplexer output is then latched by latch 611, producing signal 612, a two cycle delayed version of signal 506.

It will be apparent to one skilled in the art that the number of latches used for any given signal tap processed by buffer/align unit 404 depends on the position relative to bus 403 of the signal tap within driver/receiver logic 410. For example, if signal 600 were connected to the output of latch 501, one latch would be required in delay line 605. It is even possible to eliminate buffer/align unit 404 completely, and send signals directly from driver/receiver circuitry 410 to encode unit 406. However, it will be apparent to those skilled in the art that buffer/align unit 404 offers certain desirable electrical and timing characteristics.

In addition, it should be noted that latch 611 and the final latch in each of 605 and 606 are not functionally required. These latches serve to provide a "latched" output from buffer/align unit 404. That is to say, all the output signals of buffer/align unit 404 are driven directly from latches. This has certain desirable electrical and timing characteristics well known to those skilled in the art.

In summary, buffer/align unit 404 is used to process signal taps 600–604 from driver/receiver logic 410, in order to bring these signals into phase with respect to one another, thereby creating a delayed version of the monitored signals of bus 403 at interconnect 405. The position of the signal taps within driver/receiver logic 410 dictates the appropriate number of latch stages to be used in buffer/align unit 404.

Buffer/align unit 404, by returning the signal taps to the same phase regardless of the position of the taps in the driver/receiver circuitry, allows signal taps 600–604 to be placed so that a minimal amount of electrical load is produced on monitored bus 403. This is in contrast to the prior art mechanism of FIG. 3 in which all signal taps were placed directly onto bus 303. Furthermore, by adding one or more latches, such as latch 611 and the final latch in delay lines 605 and 606, buffer/align unit 404 can produce a latched output interface to encoding unit 406. This latched interface eases timing issues in the design of encoding unit 406. The optimal choice for the signal tap locations and therefore the overall delay induced by buffer/align unit 404 are specific to each given circumstance and will be apparent to one skilled in the art.

Buffer/align unit 404 produces a time delayed version of the monitored signals of bus 403 which is conveyed to encode unit 406. Encode unit 406 encodes the time delayed version of bus 403 in a manner that produces an image of bus 403 at a lower frequency more amenable to monitoring by test equipment.

Figure 7:
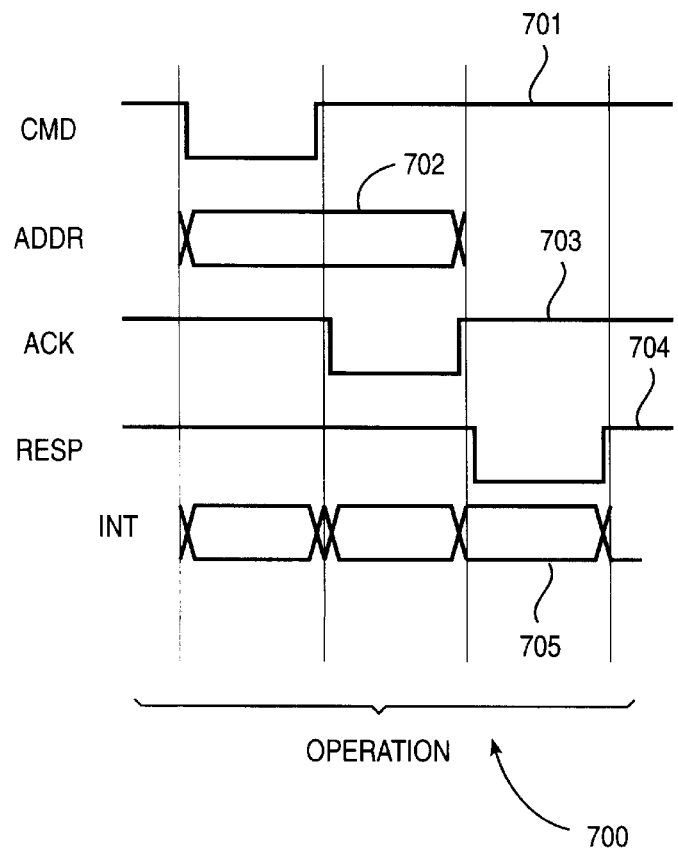
FIG. 7 is a timing diagram depicting an exemplary bus protocol.

With reference now to FIG. 7, an operation of an exemplary bus protocol will now be described. It should be noted that the exemplary protocol of FIG. 7 is intended merely to convey certain common essential characteristics of signals in bus protocols exploited by encoding unit 406.

The exemplary protocol of FIG. 7 consists of a number of signals used to convey operations, 700, over a bus. CMD signal 701 is a low active signal used to denote the beginning of an operation. Coincident with the assertion of CMD signal 701, ADDR signal 702 is driven, denoting the address of the operation. One cycle after the assertion of CMD signal 701, ACK signal 703 is asserted to indicate that ADDR signal 702 no longer needs to be driven. Note that ACK signal 703 is always driven the cycle immediately following CMD signal 701.

RESP Signal 704 is asserted (shown in FIG. 7) or deasserted one cycle after ACK signal 703, in order to indicate whether or not operation 700 was successful. The progression from CMD signal 701 to RESP signal 704 constitutes operation 700 for the bus protocol. CMD signal 701 is not permitted to be reasserted to start a new operation until the cycle after operation 700 is completed. INT signal 705 is a signal that can assume either a high or low value for each cycle of operation 700.

The number of cycles necessary to complete an operation will hereinafter be referred to as N and therefore the following relationship holds: $f_o = f_b/N$. In the protocol of FIG. 7, N=3.

In order to encode the bus signals, encoding unit 406 considers the bus signals in repeating windows of cycles equal to N. These windows will be hereinafter referred to as "encoding windows." Encoding unit 406 considers the values of signals over an entire encoding window and produces an encoded value for each signal at the lower frequency of operations: $f_o$. This encoded, lower frequency version output 407 of encoding unit 406 will hereinafter be referred to as the "debug bus."

While operations, in general, take some number of cycles to complete, it is normally allowed by most bus protocols that an operation can begin on any bus cycle. Therefore, it is possible for an operation to begin at any point within an encoding window. Encoding unit 406 will correctly produce, on debug bus 407, a correct image of the monitored bus even in the event that operations are not precisely aligned with the encoding windows.

Most signals in bus protocols fall into one of three categories. First, the signal value need only be sampled once per operation, and the timing of when the signal is asserted or valid within an encoding window can be derived from other signal(s) in the protocol. Second, the signal can only be asserted once per operation, and the timing of when the signal is asserted within an encoding window cannot be derived from other signals in the protocol. Finally, the signal can be asserted or deasserted for each cycle of an operation, and therefore can take on any value for each cycle of an encoding window. In the following description, these signals will be referred to as Type I, Type II, and Type III signals respectively.

For example, ADDR signal 702, shown in FIG. 7, is a Type I signal. It is only necessary to sample this signal during the cycle in which CMD signal 701 is asserted. This is because the bus protocol requires that ADDR signal 702 remain the same for the cycles in which it is driven.

Therefore, for each encoding window, ADDR signal 702's value will be important, at most, for one and only one cycle. CMD signal 701 can be used to determine which cycle during the encoding window should be sampled.

As described below, with reference to FIG. 8A, encoding unit 406 will only sample a Type I signal during one cycle of an encoding window. However, it is possible that the Type I signal is required by the bus protocol to hold its value for a number of cycles in the bus protocol. Under these circumstances, it is possible for the signal to change values in contravention of the bus protocol. The encoding mechanism used by encoding unit 406 will not detect this occurrence. In order to flag this error, additional logic, not explicitly described here, is used for each Type I signal to insure that the signal value obeys the conventions of the bus protocol and that an error is flagged if the bus protocol is violated.

CMD signal 701 is a Type II signal. CMD signal 701 can be asserted, at most, once per operation, and therefore, at most, once per encoding window. However, it is necessary to provide enough information on debug bus 407 to determine in which cycle of the encoding window, if any, the Type II signal was asserted. Likewise, RESP signal 704 is a Type II signal because it can only be asserted, at most, once per operation.

As with Type I signals, it is possible for a Type II signal to operate in contravention of the bus protocol (e.g., to be asserted for more than one cycle during an encoding window). The logic structure used by encoding unit 406 for Type II signals will produce erroneous results in such a circumstance. In order to flag this error, additional logic, not explicitly described here, is used for each Type II signal to insure that the signal value obeys the conventions of the bus protocol, and that an error is flagged if the bus protocol is violated.

In addition, it should be noted that ACK signal 703 is not encoded and conveyed to debug bus 407 by the mechanism of the present invention. Because ACK signal 703 has a fixed timing relationship with another signal in the bus protocol, i.e. CMD signal 701, it is possible to infer the presence of asserted ACK signal 703 from the presence of asserted CMD signal 701. Additional logic, not explicitly described here, is used to flag an error if ACK signal 703 ever fails to be asserted the cycle after CMD signal 701 is asserted, or if ACK signal 703 is asserted without CMD signal 701 being asserted in the previous cycle.

Finally, INT signal 705 is a Type III signal that ay take on any value for each cycle of an operation and therefore for each cycle of an encoding window. For such signals, encoding unit 406 must provide enough information on debug bus 407 to permit an accurate reconstruction of each cycle of the encoding window: essentially one bit of information for each bit of the signal for each cycle of the encoding window.

It should also be noted that it may be possible to align the encoding windows with the operations taking place on the monitored bus. That is to say, when an operation occurs, it will be precisely aligned with the encoding window. In effect, operations can only begin during the first cycle of an encoding window.

If such an alignment is possible, many signals that would otherwise be Type II signals become Type I signals. For example, if it were possible to insure that operations of the protocol of FIG. 7 could only commence in the first cycle on an encoding window, CMD signal 701 and RESP signal 704 would become Type I signals whose position within the encoding window would be implicit due to the alignment between encoding windows and bus operations. As will be shown later, Type I signals require less wires on debug bus 407 than Type II or Type III signals.

In summary, encoding unit 406 produces debug bus 407 by taking each signal from buffer/align unit 404 and encoding the signal according to whether the signal is a Type I, Type II, or Type III signal. The debug bus output frequency corresponds to the frequency of operations on the bus, $f_o$, which can be substantially lower than the basic frequency, $f_b$, of the monitored internal bus 403.

Figure 8A:
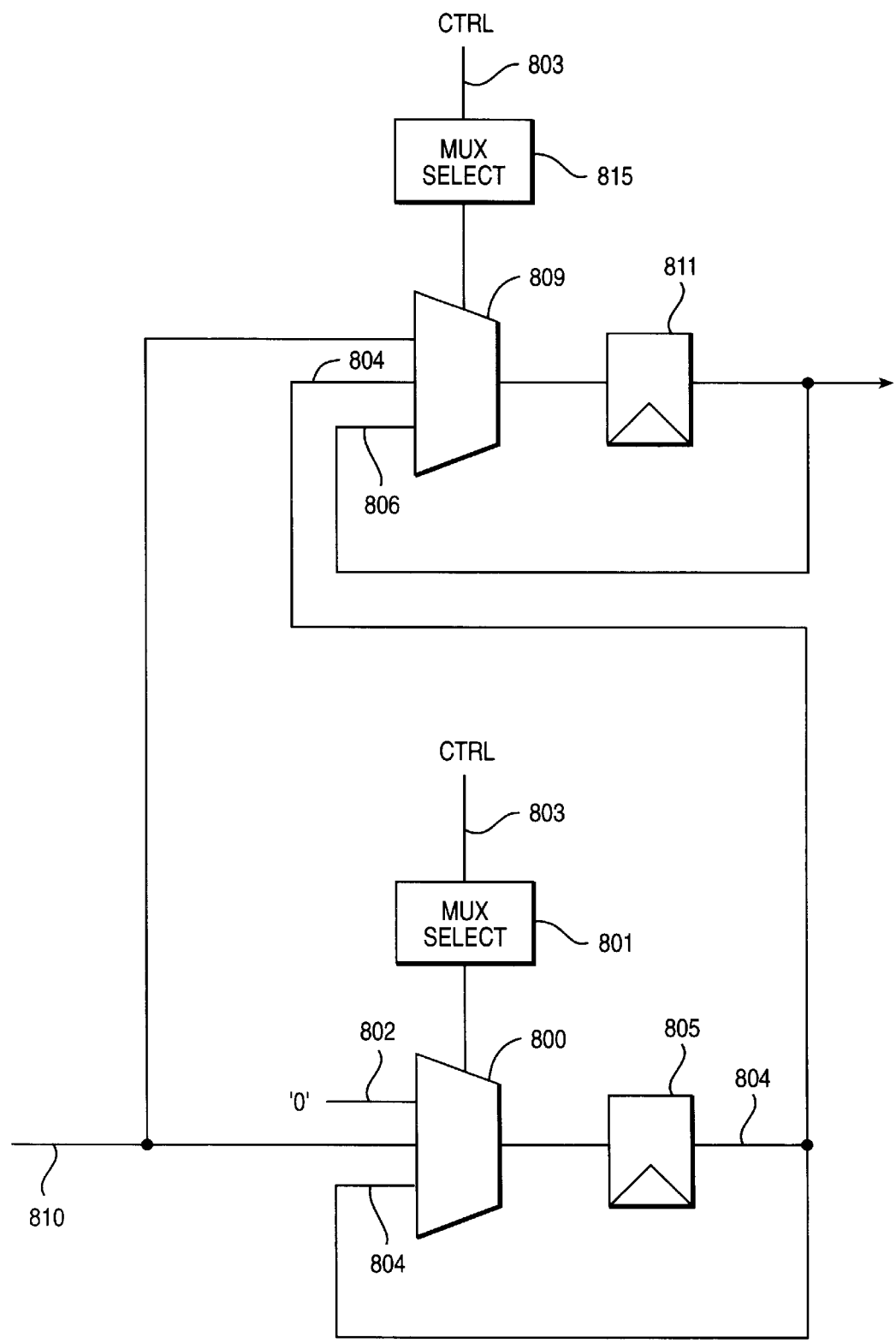
FIGS. 8A, 8B, and 8C depict exemplary encoding logic for the signal types shown in FIG. 7.
Figure 8B:
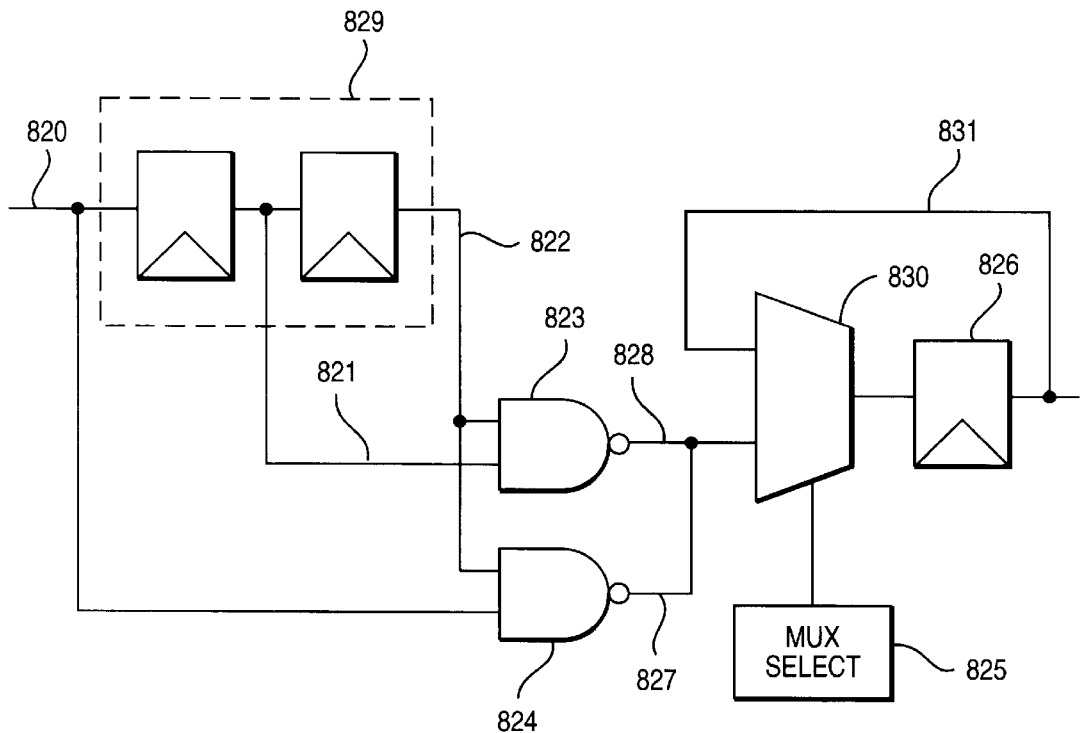
Figure 8C:
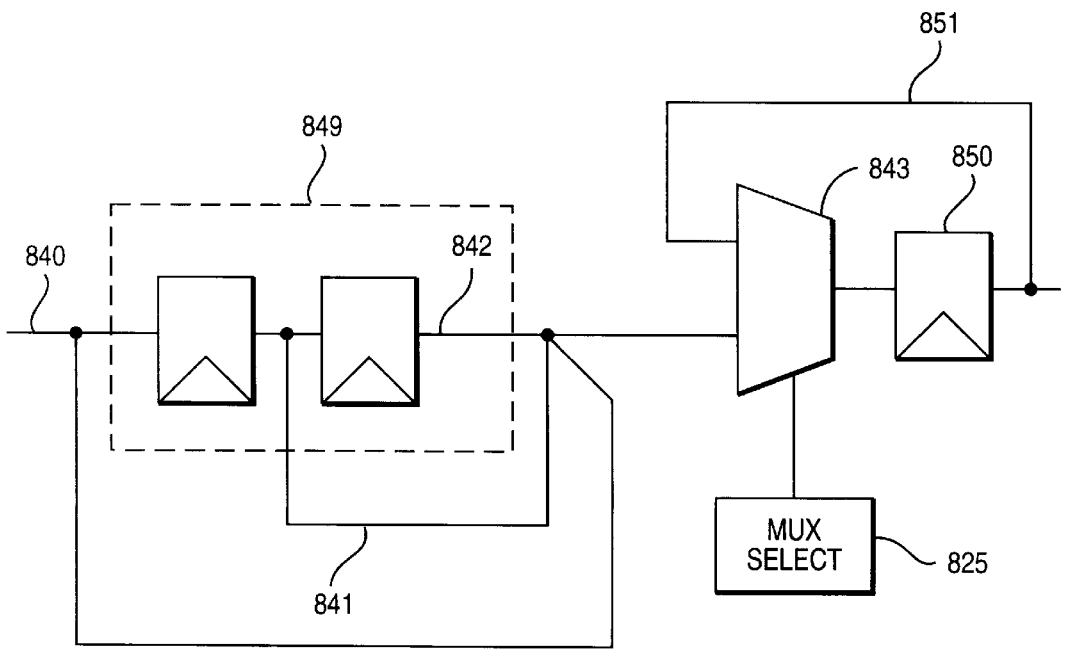

With reference now to FIGS. 8A, 8B, and 8C, exemplary encoding logic structures for a Type I, Type II and Type III signal respectively will be described. Each of the structures shown in FIGS. 8A, 8B, and 8C is implemented to encode signals with N=3. Encoding unit 406 also internally generates clocking signals that uniquely identify each cycle within an encoding window. These signals are used to control the logic structures shown in FIGS. 8A, 8B, and 8C. Extensions to the structures shown to handle different values of N will be obvious to one skilled in the art.

With reference now to FIG. 8A, an exemplary logic structure used to encode a Type I signal will now be described. To encode a Type I signal, each bit of the monitored signal is encoded into one bit on debug bus 407. To accomplish this, the encoding logic must determine which cycle, if any, within an encoding window contains the valid value for the signal. By definition, each Type I signal has one or more other signals, hereinafter referred to as CTRL 803, which together are used to determine which cycle within an encoding window contains the valid value of the Type I signal.

The signal to be encoded, signal 810, is connected to multiplexers 800 and 809. The operation of each multiplexer will be considered in turn. Multiplexer (mux) 800 is used to load latch 805 with the "best estimate" of signal 810's value until the final cycle of the encoding window. In other words, mux select logic 801 is used during the first two cycles of the encoding window to load latch 805 with the best estimate of the value of the monitored signal.

In the first cycle of the encoding window, if CTRL 803 is asserted, mux select logic 801 will select input signal 810, thereby loading latch 805 with the correct value of signal 810 for the current encoding window. However, if in the first cycle, CTRL 803 is not asserted, mux select logic 801 will select input 802, a default value arbitrarily shown in FIG. 8A as '0', to be loaded into latch 805. Therefore at the end of the first cycle of the encoding window, latch 805 is being loaded with either the valid value of signal 801, which occurred in the first cycle of the encoding window, or a default value, if signal 801 was not valid in the first cycle of the encoding window.

In the second cycle of the encoding window, mux select logic 801 will select input signal 810 if CTRL 803 is asserted and will select input 804 if CTRL 803 is not asserted. If CTRL 803 is asserted, the valid value of signal 810 is sampled into latch 805. If CTRL 803 is not asserted, the best estimate from the first cycle of the encoding window, stored in latch 805, is used. Therefore at the end of the second cycle, latch 805 is being loaded with either the valid value of signal 810 from the second cycle of the encoding window, or the best estimate from the first cycle of the encoding window.

Therefore, during the last cycle of the encoding window, signal 804, the output of latch 805, represents the best estimate of the signal 810's value for the first two cycles of the encoding window.

During the last cycle of the encoding window, mux select logic 815 selects between signal 804 and signal 810. If CTRL 803 is active during the last cycle of the encoding window, signal 810 was valid during the last cycle of the encoding window and is loaded into latch 811. If CTRL 803 is not active, signal 807 is selected providing the best estimate of the signal value from all previous cycles in the encoding window. For all other cycles of the encoding window, mux select logic 815 selects input 806, thereby holding the valid value of the signal on the debug bus. Latch 811 is only updated once per encoding window and therefore the debug bus frequency is equivalent to the lower frequency of operations: $f_o$.

With reference now to FIG. 8B, an exemplary logic structure for encoding a Type II signal will now be described. The logic structure shown in FIG. 8B is intended to encode a low-active (i.e. the signal is asserted when equal to a binary '0' and unasserted when binary '1') Type II signal. Changes to encode a high-active signal will be obvious to one skilled in the art.

For each Type II signal, the debug bus must contain enough information to ascertain which cycle, if any, within the encoding window the signal was asserted. In order to allow this, the encoding logic converts each bit of a Type II signal into $\lceil \log_2(N+1) \rceil$ bits on debug bus 407. If N=3, two bits are necessary to encode a Type II signal. These two bits can take on any of four values indicating which cycle within the encoding window the signal was asserted (three cases) or that the signal was not asserted (one case).

Signal 820, the signal to be encoded, is passed through two stage latch delay line 829, producing signals 821 and 822. Signals 820, 821, and 822 constitute the values of the signal to be encoded over an entire encoding window. During the last cycle of the encoding window, signal 820 contains the value of the signal to be encoded during the last cycle of the encoding window, signal 821 contains the value of the signal to be encoded during the second cycle of the encoding window, and finally, signal 822 contains the value of the signal to be encoded during the first cycle of the encoding window.

Signals 820, 821, and 822 are encoded by NAND gates 823 and 824 to produce a two bit vector, signals 828 and 827, for each bit of the signal to be encoded. These two bits indicate, during the last cycle of the encoding window, as shown by the table below, whether the signal to be encoded was asserted during the first, second, or third cycle of the encoding window or not at all.

TABLE I

| 822 | 821 | 820 | 828 | 827 | Value |
|---|---|---|---|---|---|
| 1 | 1 | 1 | 0 | 0 | 0 |
| 0 | 1 | 1 | 1 | 1 | 3 |
| 1 | 0 | 1 | 1 | 0 | 2 |
| 1 | 1 | 0 | 0 | 1 | 1 |

If signals 827 and 828 are considered as a two bit binary number, a "value" can be assigned to these signals as shown in Table I. If signal 820 was not asserted, the value for the vector is 0. Likewise, if the signal to be encoded was asserted in the first, second, or third cycle of the encoding window, the value is 3, 2, and 1 respectively. The values taken on by the two bit vector for each case is specific to the encoding logic used, NAND gates 823 and 824 in FIG. 8B, and can easily be altered by one skilled in the art to produce whatever encoding is desired.

Signals 827 and 828 are concatenated and passed through multiplexor 830 to latch 826. Mux select logic 825 selects input 831 for all cycles except the final cycle of the encoding window. During the final cycle of the encoding window, the concatenation of signals 827 and 828 is loaded into latch 826. As for the Type I signal, latch 826 is only updated once per encoding cycle and therefore the debug bus frequency is equal to the lower frequency of operations: $f_o$.

With reference now to FIG. 8C, an exemplary logic structure for encoding a single bit of a Type III signal will now be described. As with a Type I signal, the Type III signal to be encoded, 840, is passed through a two stage latch delay line 849, producing signals 840, 841, and 842, constituting the values of the signal to be encoded over an entire encoding window.

For each Type III signal, debug bus 407 must contain enough information to convey the value of the signal for each cycle of the encoding window. Unlike Type I and Type II signals, a Type III signal can assume any possible value for each cycle of the encoding window. Therefore, for each bit of a Type III signal, N bits must be used on debug bus 407 to convey the value of the Type III signal for each cycle of the encoding window.

During the last cycle of the ending window, signal 840 contains the value of the signal to be encoded during the last cycle of the encoding window, signal 841 contains the value of the signal to be encoded during the second cycle of the encoding window, and signal 842 contains the value of the signal to be encoded during the first cycle of the encoding window.

These three signals, 840–842, are concatenated and passed into multiplexor 843. Mux control logic 825 selects input 851 for all cycles except the final cycle of the encoding window. During the final cycle of the encoding window, signals 840, 841, and 842, representing the values of the signal to be encoded over the encoding window, are loaded into latch 850. Latch 850 is only updated once per encoding cycle and therefore the debug bus frequency is equal to the lower frequency of operations: $f_o$.

Figure 9A:
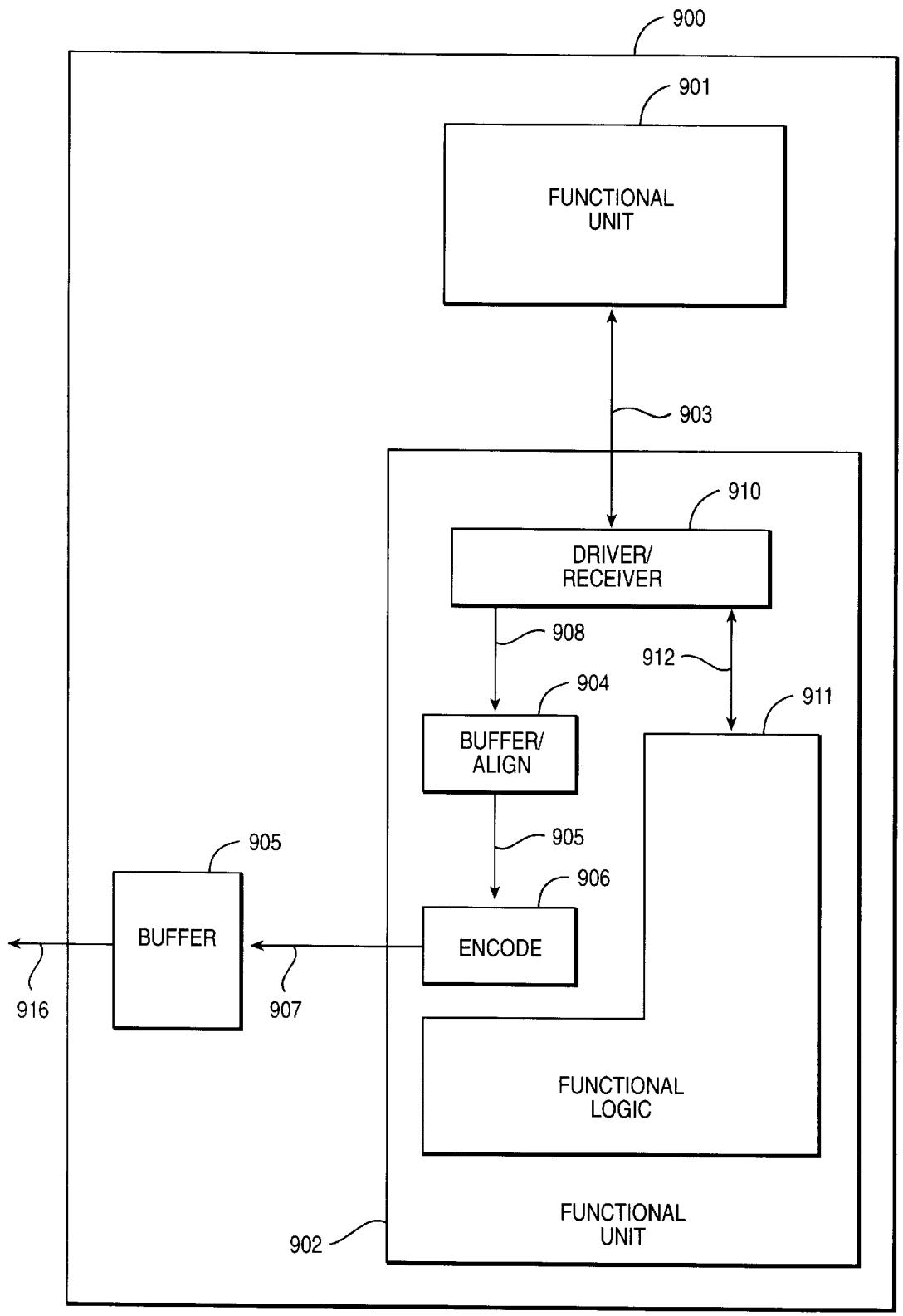
FIG. 9A is a block diagram of a VLSI chip, including a PowerPC 60x bus, and using a monitoring mechanism according to the teachings of the present invention.

With reference now to FIG. 9A, a block diagram of the present invention as applied to a specific bus protocol, i.e. the PowerPC 60x bus protocol, will now be described. VLSI chip 900 is shown with functional units 901 and 902 interconnected by PowerPC 60x bus 903. Driver/receiver logic 910 differs from driver/receiver logic 410 (shown in FIG. 4). Driver/receiver logic 910 is described in detail below, with reference to FIG. 9B.

The PowerPC 60x bus protocol is similar in a broad sense to the protocol depicted in FIG. 7. The PowerPC 60x bus consists, generally, of two distinct split portions: an address/control bus and a data bus. The address/control bus is used to convey operations among the functional units. The data bus is used to convey data between functional units. Note that in the following description, an underbar after a signal name, as in TS_, is used to indicate that the signal is a low-active signal.

Operations on the address/control bus of 60x bus 903 begin with the single-cycle assertion of control signal TS_ (similar to CMD signal 701 shown in FIG. 7). Coincident with the assertion of TS_, a 32-bit address bus, A0-31, and a number of other control signals are asserted. One or more cycles after the assertion of TS_, another signal, acknowledgement signal AACK_, is asserted to indicate the conclusion of driving the address and control signals on the address bus. Finally, one cycle after the assertion of AACK_, two control signals, ARTRY_ and SHD_, are either asserted or de-asserted to indicate whether the operation was successfully completed or not, as well as to indicate coherency information for the transfer respectively. After the assertion of ARTRY_ and SHD_, TS_ may then be reasserted in order to begin another operation.

The data bus portion of the PowerPC 60x bus is a largely independent 64-bit data bus used to transfer data. Data can be transferred on consecutive bus cycles as indicated by the assertion of signal TA_. For a full description refer to chapters 7 and 8 of the "PowerPC 604 RISC Microprocessor User's Manual MPR604UMU-01/MPC604UM/AD" incorporated herein by reference.

In the described embodiment of the present invention shown in FIG. 9A, the following signals, as described in the PowerPC 604 RISC Microprocessor User's Manual, of the 60x bus are monitored: BR_, BG_, TS_, A0-31, TT0-4, TBST_, TSIZ0-2, GBL_, CI_, WT_, TC0-2, AACK_, ARTRY_, SHD_, DBG_, DBWO_, TA_, DH0-31, DL0-31. This is a representative sampling of the signals that are advantageous to monitor on the PowerPC 60x bus and not a complete list of the signals comprising the PowerPC 60x bus. The addition of the other signals in the PowerPC 60x bus to the described embodiment of the present invention will be apparent to one skilled in the art.

The number of cycles, N, necessary to complete an operation for the PowerPC 60x bus is determined by determining how many cycles, at a minimum, are required between assertions of the TS_ signal. For example, consider a PowerPC 60x bus in which AACK_ is asserted the second cycle after the assertion of TS_. In such a system, TS_ can be asserted at most once every four cycles. Thus N=4. The PowerPC 60x bus protocol does not require a fixed number of cycles to occur between the assertion of TS_ and AACK_. However in most systems, this timing relationship will be, if not fixed, at least bounded to a maximum possible value allowing for a fixed value of N.

In the system of FIG. 9A, the logical structure of driver/receiver logic unit 910, buffer/align unit 904, and encoding unit 906 are determined by the value of N as was demonstrated earlier and discussed above with reference to FIGS. 4 through 8C. Further, the following signals are input-only signals: BR_, TC0-2, CI_, WT_. The following signals are output-only signals: AACK_, BG_, DBG_, DBWO_, TA_. Finally, the following signals are bi-directional signals: TS_, ARTRY_, SHD_, A0-31, TT0-4, GBL_, TBST_, TSIZ0-2, DH0-31, DL0-31. These signals, with the exception of ARTRY_ and SHD_ are processed by driver/receiver logic 910 as has been described hereinbefore. The following signals are Type I signals (qualified by the assertion of TS_): A0-31, TT0-4, TC0-2, CI_, WT_, GBL_, TSIZ0-2, TBST_. The following signals are Type II signals: TS_, ARTRY_, SHD_. Finally, the following signals are Type III signals: BR_, BG_, DBG_, DBWO_, TA_. These signals are processed by buffer/align unit 904 as described hereinbefore.

The ARTRY_ and SHD_ signals must be processed by driver/receiver logic 910 in a slightly altered manner than was described hereinbefore. Due to the bi-directional nature of the ARTRY_ and SHD_ signals, a system of half-cycle precharging is used the cycle after ARTRY_ and SHD_ are asserted in order to prevent bus electrical collisions. Unfortunately, such precharging will allow the signal to appear as either a '0' or '1' in an unpredictable manner depending on varying electrical characteristics of the bus. In such an event, it is possible for ARTRY_ and SHD_, both Type II signals, to appear to be asserted more than once per encoding window flagging an apparent error. This apparent error, however, is not real and should be ignored.

The essential difficulty with the ARTRY_ and SHD_ signals are the half-cycle pre-charge cycles that may appear to be either binary '0' or '1'. In order to correct this condition, additional logic is added to driver/receiver logic 910 to mask off the ARTRY_ and SHD_ signals (i.e. force to binary '1') for all cycles except the cycle after the assertion of AACK_, where ARTRY_ and SHD_ may be asserted. The PowerPC 60x Bus protocol requires that the ARTRY_ and SHD_ signals are either de-asserted (binary '1') or in pre-charge cycles for all cycle except the cycle after AACK_ is asserted. In these other cycles, the image of the ARTRY_ and SHD_ signals presented to encoding logic unit 906 is forced to be binary '1' irrespective of the value perceived from bus 903.

Figure 9B:
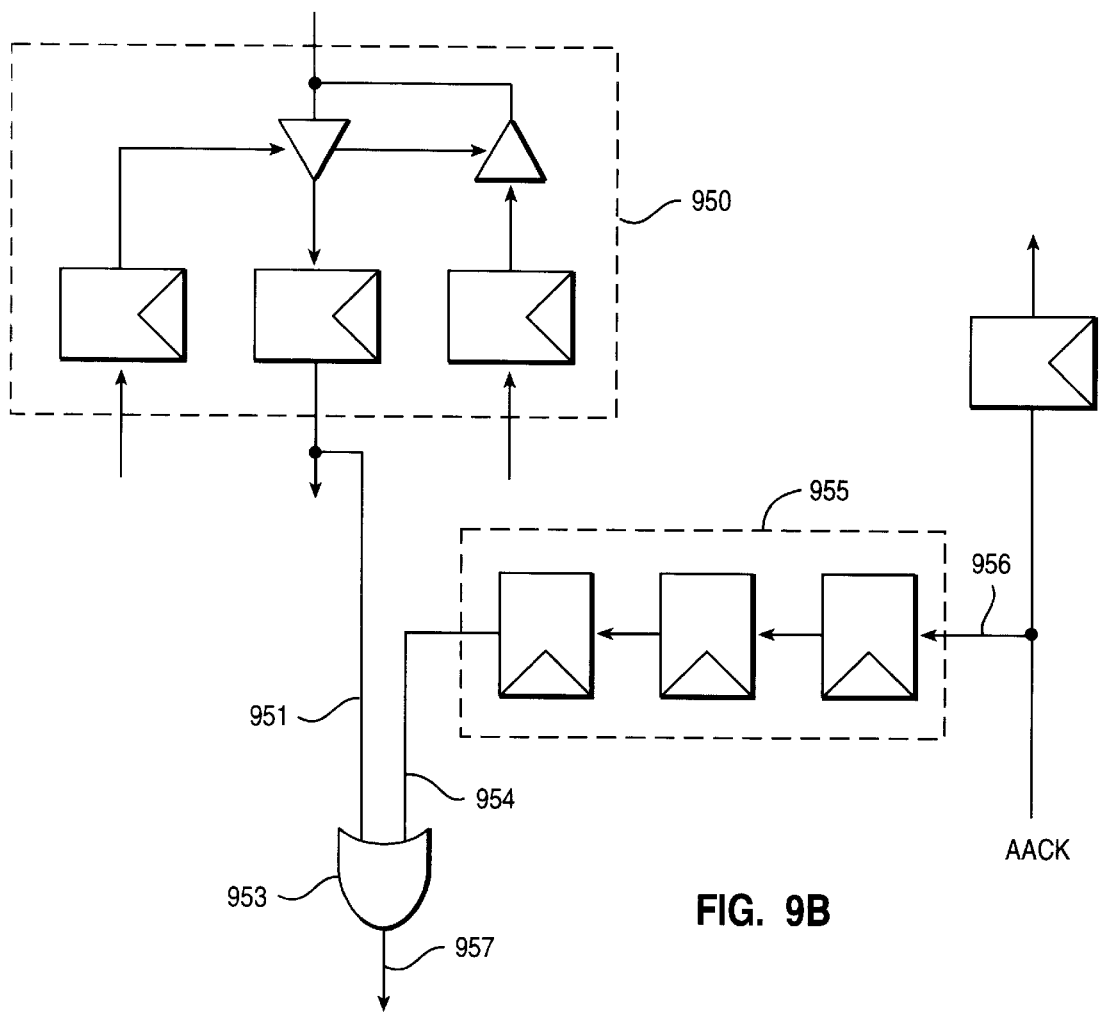
FIG. 9B is a schematic diagram of a portion of the driver/receiver circuitry within the VLSI chip depicted in FIG. 9A.

With reference now to FIG. 9B, a schematic representation of the portion of driver/receiver logic unit 910, responsible for processing signals ARTRY_ and SHD_, will now be described. An additional tap of AACK_ signal 956 is processed by latch delay line 955. In order to qualify the ARTRY_ and SHD_ signals, a signal must be generated that is asserted (low-active) the cycle after AACK_ is asserted. Latch delay line 955 takes AACK_ signal 956 and delays it by one cycle to coincide with the cycle of interest for ARTRY_ and SHD_, and then further delays it by two additional cycles to bring it into phase with signal tap 951 of ARTRY_ and SHD_.

Logic structure 950 is the structure used by driver/receiver logic 910 for driving and receiving a bi-directional signal as described hereinbefore. This logic structure is replicated twice within driver/receiver logic 910 to process signals ARTRY_ and SHD_. Signal tap 951 is then further processed by logical OR gate 953 to produce a corrected version of either ARTRY_ or SHD_ at signal 957. Signal 957 represents a corrected version of the ARTRY_ or SHD_ signal that is free of the effects of the pre-charge cycles mandated by the PowerPC 60x bus protocol. Signal 957 is processed by buffer align unit 904 in a like manner for any uncorrected Type II signal.

Figure 9C:
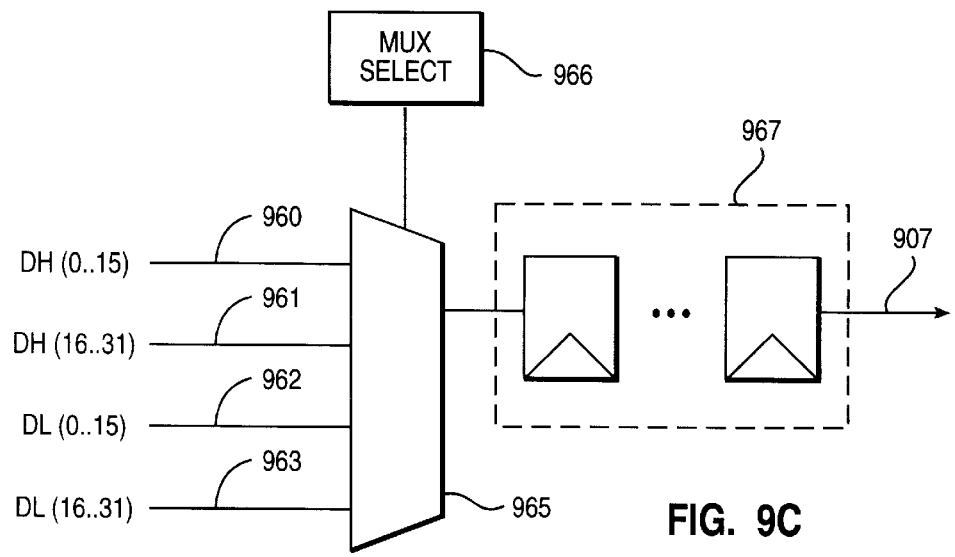
FIG. 9C is a schematic diagram of encoding circuitry within the VLSI chip depicted in FIG. 9A.

Finally, with reference now to FIG. 9C, a schematic representation of the logic used to monitor the data bus portion of the PowerPC 60x bus will now be described. Note that the circuitry shown in FIG. 9C is contained within encode unit 906. The data bus of the PowerPC bus can change in any cycle and is therefore a Type III signal. In addition, the data bus consists of 64 bits of data. For large values of N, a prohibitive number of external pins would be required to monitor the data bus at the reduced frequency. Instead, the described embodiment of the current invention takes a different approach to monitoring the data bus, as described below.

The data bus, after the appropriate processing by driver/receiver logic 910 for bi-directional signals, is divided into four distinct signals: 960, 961, 962, and 963, each representing one-fourth of the over-all data bus. These signals are passed through multiplexer 965, controlled by mux selection logic 966, to select which portion of the data bus is to be monitored. The selected portion of the data is then further passed through latch delay line 967 to produce debug bus outputs 907. Note that in the described embodiment, only 16 out of a possible 64 data bus signals are monitored. It should also be noted that these debug bus signals occur at the basic frequency of the bus: $f_b$. While this mechanism requires testing equipment that operates at the basic bus frequency, only a small number of signals, sixteen, operate at this frequency. The mechanism of observing a smaller subset of the available data bus signals at full frequency is used instead of encoding the signals in order to ease the number of external pins necessary to implement debug bus 907.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. An apparatus for monitoring a 60x bus, comprising:
    means for obtaining one or more bus signals, having a first frequency, from the 60x bus;
    means for masking one or more particular bus signals during one or more half-cycle pre-charge bus cycles;
    means for producing one or more debug signals, having a second frequency, wherein each of the 60x bus signals corresponds to one or more of the debug signals; and
    means for sending the debug signals to a bus monitor at the second frequency.

2. An apparatus according to claim 1, wherein said means for obtaining further comprises means for obtaining a set of data signals, wherein the set of data signals is a portion of a total number of data signals available on the 60x bus.

3. An apparatus according to claim 1, wherein said means for obtaining comprises means for tapping one or more bus signals from driver/receiver circuitry connected to the 60x bus.

4. An apparatus according to claim 1, wherein said means for masking comprises means for logically combining the particular bus signals with an acknowledgment signal.

5. An apparatus according to claim 1, wherein said means for producing comprises:
    means for determining a cycle during which a selected bus signal is valid; and
    means for saving a value of the selected bus signal as a corresponding debug signal during the determined cycle.

6. An apparatus according to claim 5, wherein said means for determining comprises one or more control signals.

7. An apparatus according to claim 1, wherein said means for producing comprises:
    means for determining a plurality of values for a selected bus signal, each value corresponding to a cycle within an encoding window;
    means for using the plurality of values to determine during which cycle within the encoding window the selected bus signal contained a valid value; and
    means for saving the valid value of the selected bus signal as one or more corresponding debug signals.

8. An apparatus according to claim 7, wherein said means for determining a plurality of values comprises a delay line, wherein the delay line includes one or mote latches.

9. An apparatus according to claim 1, wherein said means for producing comprises:
    means for determining a plurality of values for a selected bus signal, each value corresponding to a cycle within an encoding window; and
    means for encoding the plurality of values into a plurality of debug signals for the selected bus signal.

10. An apparatus according to claim 1, further comprising means for aligning the bus signals with each other, wherein the aligned bus signals represent a set of bus signals which occurred during a same bus cycle.

11. An apparatus for monitoring a 60x bus in an integrated circuit, comprising:
    driver/receiver circuitry, operably coupled to the 60x bus;
    one or more connections within said driver/receiver circuitry for tapping one or more of the bus signals;
    masking circuitry within said driver/receiver circuitry for masking one or more particular bus signals during one or more half-cycle pre-charge bus cycles; and
    encoding circuitry, operably coupled to said connections, wherein said encoding circuitry receives the bus signals and produces one or more debug signals, the debug signals having a debug frequency lower than the operating frequency of the 60x bus, and wherein each bus signal corresponds to one or more debug signals.

12. An apparatus according to claim 11, wherein said masking circuitry comprises a logic circuit for logically combining the particular bus signals with an acknowledgment signal.

13. An apparatus according to claim 11, wherein said encoding circuitry further comprises:
    one or more control signals, wherein the control signals determine a bus cycle during which a selected bus signal is valid; and
    one or more multiplexers, operably coupled to said control signals, wherein said multiplexers save a value for the selected bus signal during the bus cycle in which the selected bus signal is determined to be valid.

14. An apparatus according to claim 11, wherein said encoding circuitry further comprises:
    one or more latches, for saving a plurality of values for a selected bus signal, wherein each value corresponds to the value of the selected bus signal during a corresponding bus cycle;
    logic circuitry, which uses the plurality of values to select a bus cycle during which the selected bus signal contained a valid value; and
    logic circuitry for saving the valid value of the selected bus signal as one or more corresponding debug values.

15. An apparatus according to claim 11, wherein said encoding circuitry further comprises:
    one or more latches, for saving a plurality of values for a selected bus signal, wherein each value corresponds to the value of the selected bus signal during a corresponding bus cycle; and
    logic circuitry, wherein said logic circuitry encodes the plurality of values into a plurality of debug signals for the selected bus signal.

16. An apparatus according to claim 11, further comprising alignment circuitry, wherein said alignment circuitry produces one or more aligned bus signals, and wherein the aligned bus signals occurred during a same bus cycle.

17. An apparatus according to claim 16, wherein said alignment circuitry comprises one or more buffers operably coupled to said driver/receiver circuitry and to said encoding circuitry.

18. A method for monitoring a 60x bus, comprising:
    obtaining one or more bus signals, having a first frequency, from the bus;
    masking one or more particular bus signals during one or more half-cycle pre-charge bus cycles;
    producing one or more debug signals, having a second frequency, wherein each of the bus signals corresponds to one or more of the debug signals; and
    sending the debug signals to a bus monitor at the second frequency.

19. A method according to claim 18, wherein said obtaining comprises tapping one or more bus signals from driver/receiver circuitry connected to the bus.

20. A method according to claim 18, wherein said masking comprises logically combining the particular bus signals with an acknowledgment signal.

21. A method according to claim 18, wherein said producing comprises:

determining a cycle during which a selected bus signal is valid; and in response to said determining, saving a value of the selected bus signal as one or more corresponding debug signals during the determined cycle.

22. A method according to claim 18, wherein said producing comprises:

determining a plurality of values for a selected bus signal, each value corresponding to a cycle within an encoding window;

using the plurality of values to determine during which cycle within the encoding window the selected bus signal contained a valid value; and saving the valid value of the selected bus signal as one or more corresponding debug signals.

23. A method according to claim 18, wherein said producing comprises:

determining a plurality of values for a selected bus signal, each value corresponding to a cycle within an encoding window; and encoding the plurality of values into a plurality of debug signals for the selected bus signal.

24. A method according to claim 18, further comprising aligning the bus signals with each other, wherein the aligned bus signals represent a set of bus signals which occurred during a same bus cycle.

* * * * *